United States Patent
Yang et al.

(10) Patent No.: US 9,930,767 B2
(45) Date of Patent: Mar. 27, 2018

(54) PLASMA-CONTAINING MODULAR ARC GENERATOR

(71) Applicant: Xiang Long, Hebei Province (CN)

(72) Inventors: Chengxian Yang, Huizhou (CN); Xiang Long, Shenzhen (CN)

( * ) Notice: Subject to any disclaimer, the term of this patent is extended or adjusted under 35 U.S.C. 154(b) by 0 days.

(21) Appl. No.: 15/075,269

(22) Filed: Mar. 21, 2016

(65) Prior Publication Data

US 2017/0273167 A1    Sep. 21, 2017

(51) Int. Cl.
| | |
|---|---|
| *H02J 7/00* | (2006.01) |
| *H02J 7/35* | (2006.01) |
| *H05B 7/18* | (2006.01) |
| *H05H 1/48* | (2006.01) |
| *H02J 7/34* | (2006.01) |

(52) U.S. Cl.
CPC .............. *H05H 1/48* (2013.01); *H02J 7/0068* (2013.01); *H02J 7/35* (2013.01); *H05B 7/18* (2013.01); *H02J 7/345* (2013.01)

(58) Field of Classification Search
USPC .......................................................... 307/19
See application file for complete search history.

(56) References Cited

U.S. PATENT DOCUMENTS

| | | | | |
|---|---|---|---|---|
| 4,032,842 A | * | 6/1977 | Green | H01T 13/58 324/400 |
| 2015/0047609 A1 | * | 2/2015 | Kleczewski | F02D 41/0097 123/438 |
| 2016/0355411 A1 | * | 12/2016 | Fahs, II | |
| 2017/0155274 A1 | * | 6/2017 | Cher | H02J 7/35 |

* cited by examiner

*Primary Examiner* — Rexford Barnie
*Assistant Examiner* — Xuan Ly
(74) *Attorney, Agent, or Firm* — Wayne & Ken, LLC; Tony Hom

(57) ABSTRACT

The present invention discloses a plasma-containing modular arc generator, comprising: a shell; an energy storage device; a charging circuit module and a boosting circuit module arranged on both sides of the energy storage device; a charging input end, a switch button and an output end arranged on the shell; a high-voltage converting module connected to one side of the boosting circuit module; a USB output port arranged on the output end; and a high-voltage ionizing ignition module connected to one end of the high-voltage converting module, wherein the energy storage device comprises an energy storage module of a polymer battery, an input end and an input converting circuit of a solar panel; and the boosting circuit module mainly comprises a control chip, an MOS transistor and a flying back transformer. The arc generator designed in the present invention not only has low cost and energy-conservation and environment-protection, but also is suitable for scale production.

6 Claims, 4 Drawing Sheets

PLASMA-CONTAINING MODULAR ARC GENERATOR

TECHNICAL FIELD

The present invention relates to the technical field of ignition generators, and more particularly, relates to a plasma-containing modular arc generator.

BACKGROUND

Various industrial furnaces such as heating furnaces, cracking furnaces, boilers, etc., and various industrial torches which use fuel gas, oil and pulverized coal as main fuel are indispensable important devices in such industries as oil exploitation, petrochemical industry, smelting, thermal power generation, etc. These devices need safe and reliable ignition devices. Meanwhile, the ignition devices are also needed in daily life.

At present, most of domestic and foreign ignition devices adopt fuel type igniters. The success rate of the ignition devices is reduced because of loss of ignition capability in severe environments of coking and carbon deposition, pollution of conductive media, etc., complicated structure, high cost, complicated wiring prevailing in wiring devices, insecurity and other problems. Meanwhile, the fuel type igniters waste resources and cannot reasonably use limited resources.

Thus, the problem to be solved by those skilled in the art is how to provide an ignition generator with low cost, green environmental protection and capability of saving limited energy.

SUMMARY

In view of this, the present invention provides a plasma-containing modular arc generator. The arc generator not only uses no fossil fuel causing green environmental protection, but also has no mechanical wear and is convenient in utilization; and ion arcs can be generated instantaneously only by pressing a switch button, which is safe and reliable.

To achieve the above purpose, the present invention adopts the following technical solution:

A plasma-containing modular arc generator comprises: a shell, and also comprises: an energy storage device arranged in the shell; a charging circuit module and a boosting circuit module arranged on both sides of the energy storage device; a charging input end, a switch button and an output end arranged on the shell; a high-voltage converting module connected to one side of the boosting circuit module through a discharging mode; a USB output port arranged on the output end; and a high-voltage ionizing ignition module connected to one end of the high-voltage converting module, wherein the energy storage device comprises an energy storage module of a polymer battery, as well as an input end and an input converting circuit of a solar panel successively connected with the energy storage module of the polymer battery; the boosting circuit module mainly comprises a control chip, an MOS transistor and a flying back transformer, controls alternating current on the MOS transistor through a square wave signal generated by the control chip, and conducts boost through the flying back transformer connected in series; and a USB charging interface and a device terminal charging interface are arranged on the charging input end.

Preferably, in the above plasma-containing modular arc generator, the energy storage module of the polymer battery can be replaced by an energy storage nlodule of a capacitor, and the energy storage module of the polymer battery is provided with a power supply chip.

Preferably, in the above plasma-containing modular arc generator, the shell is nlade of metal.

Preferably, in the above plasma-containing modular arc generator, a radiation fin is installed on the MOS transistor.

Preferably, in the above plasma-containing modular arc generator, a DIP socket is arranged on one end of the control chip, and meanwhile, a capacitor, a diode, a potentiometer and a resistor are connected through the DIP socket.

Preferably, in the above plasma-containing modular arc generator, the high-voltage converting module comprises a triode and a transformer and adjusts the output current and the output voltage of the transformer through the resistor; and meanwhile, the triode is connected with one end of the flying back transformer in series.

Preferably, in the above plasma-containing modular arc generator, the triode drives the transformer through a self-excitation node.

An arc means a strong and persistent discharging phenomenon generated by voltage in a gas medium between two electrodes or between an electrode and parent nlaterial. So-called gas discharge means a conductive phenomenon that a charge penetrates through the gas medium from one electrode and reaches the other electrode when a potential difference exists between the two electrodes. However, not all of gas discharge phenomena are generated by the arc. The arc is only one of multiple forms. Generation of charged particles in the arc: There must be two conditions for generating gas discharge between the two electrodes: 1, The charged particles must exist, and 2, an electric field with certain intensity must exist between the two electrodes.

The charged particles in the arc refer to electrons, cations and anions. The charged particles for igniting the arc and keeping the arc burning are electrons and cations. The two kinds of charged particles are generated mainly depending on two physical processes, i.e., electron emission of the gas medium in the arc and electron emission of the electrodes.

The strongest one of gas discharge is self-maintained discharge. When a power supply provides electric energy with higher power, if the voltage between the electrodes is not high, higher current can continuously pass through gas or metallic vapor between the two electrodes, powerful radiance is emitted and high temperature is generated. This is arc discharge. The arc itself is a thermal plasma.

It is known from the above technical solution that compared with the prior art, the present invention discloses and provides a plasma-containing modular arc generator. Firstly, the present invention uses a boosting circuit module for converting a low-voltage DC power supply into high-voltage high-frequency AC. When a predetermined voltage value is reached, air is broken down to discharge to form a plasma flame, thereby igniting combustibles. Secondly, according to the present invention, such commodities as cigarette lighters, igniters, etc. can be derived. Meanwhile, a circuit of the boosting circuit module uses a single-pipe self-excitation principle. A main winding and a feedback winding generate alternate oscillation. An electrical oscillation signal is amplified through a triode to obtain low-voltage high-frequency AC, and then, a transformer is used to boost, achieving stronger security.

Therefore, the present invention is a plasma-containing modular arc generator integrating many advantages of green environmental protection, low cost, simple design, strong security and convenient operation.

DESCRIPTION OF THE DRAWINGS

To more clearly describe the technical solutions in the embodiments of the present invention or in the prior art, the drawings required to be used in the description of the embodiments or the prior art will be simply presented below. Apparently, the drawings in the following description are merely the embodiments of the present invention, and for those skilled in the art, other drawings can also be obtained according to the provided drawings without contributing creative labor.

DETAILED DESCRIPTION

Figure 1:
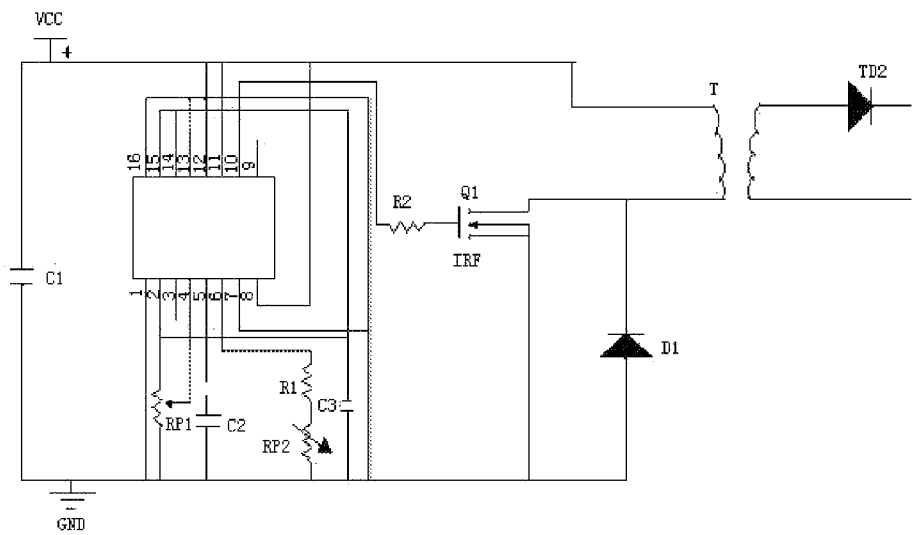
FIG. 1 is a circuit principle diagram of the present invention.
Figure 2:
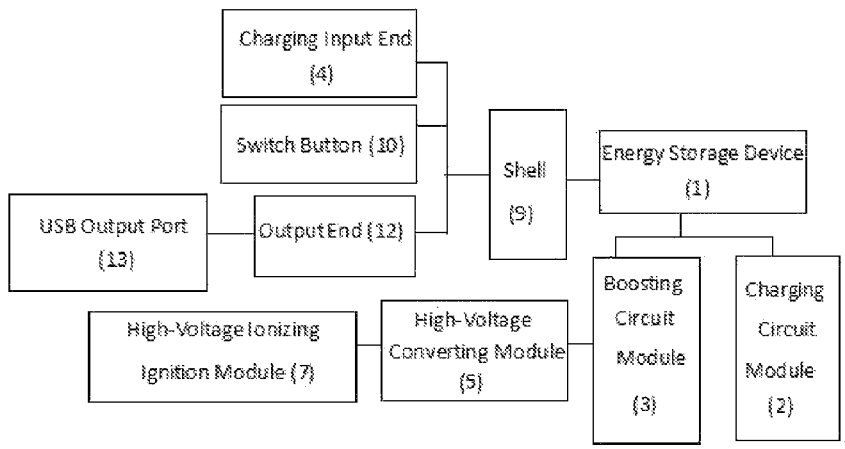
FIG. 2 is a structural frame diagram of the present invention.
Figure 3:
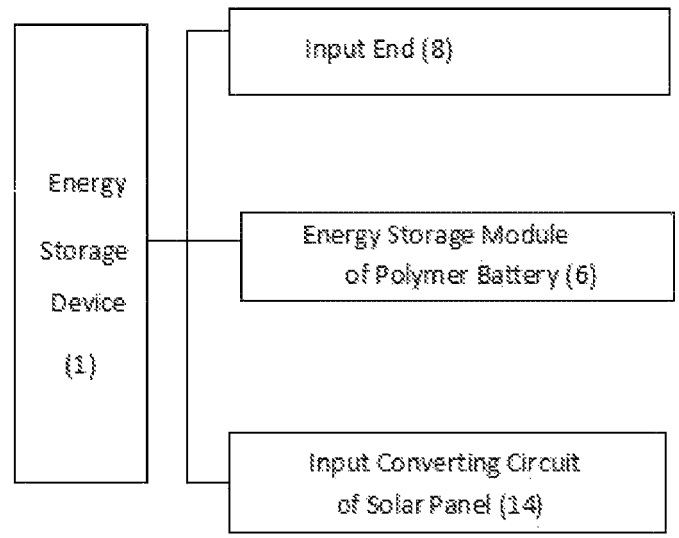
FIG. 3 is a structural frame diagram of an energy storage device of the present invention.
Figure 4:
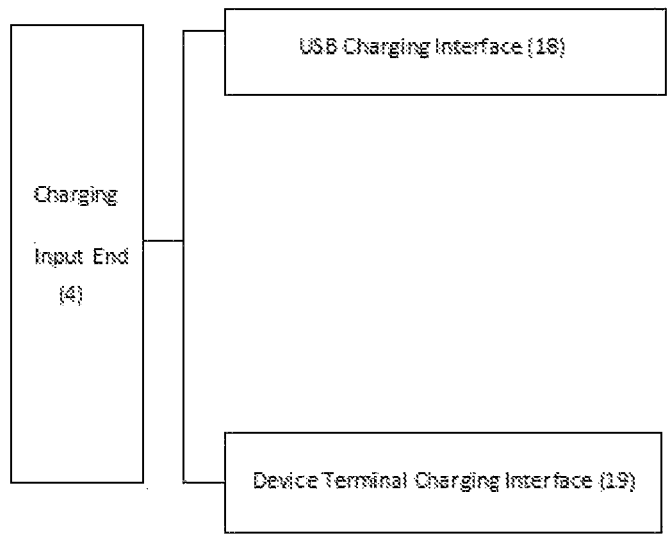
FIG. 4 is a structural frame diagram of a charging input end of the present invention.
Figure 5:
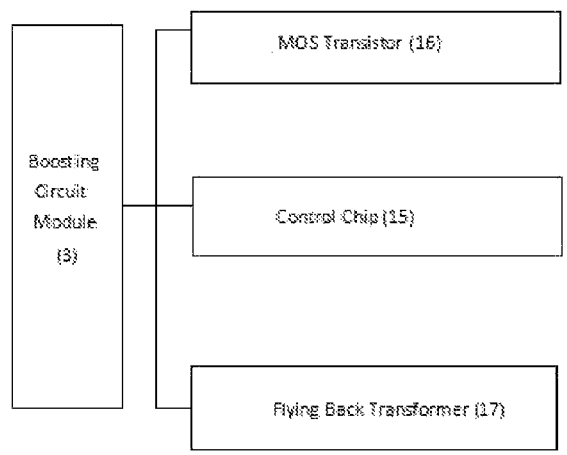
FIG. 5 is a structural frame diagram of a boosting circuit module of the present invention.
Figure 6:
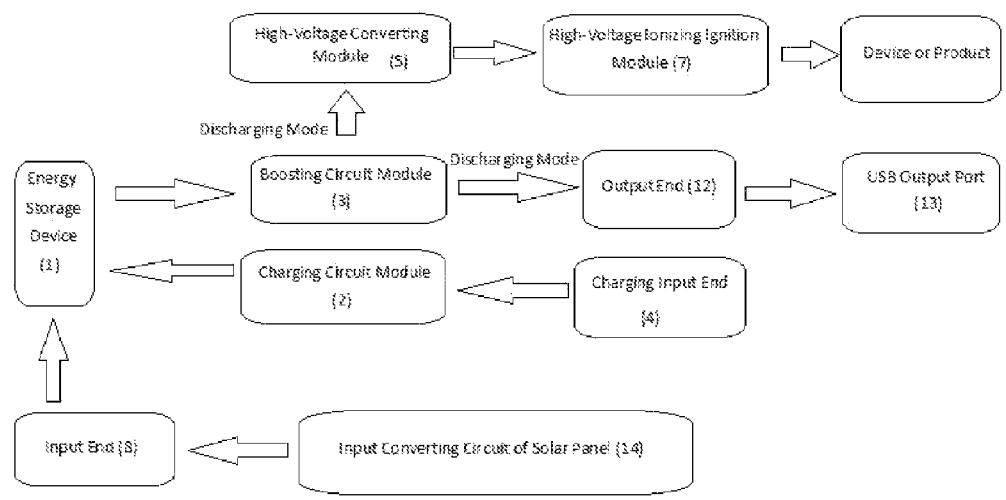
FIG. 6 is a schematic diagram of a working principle of the present invention.
Figure 7:
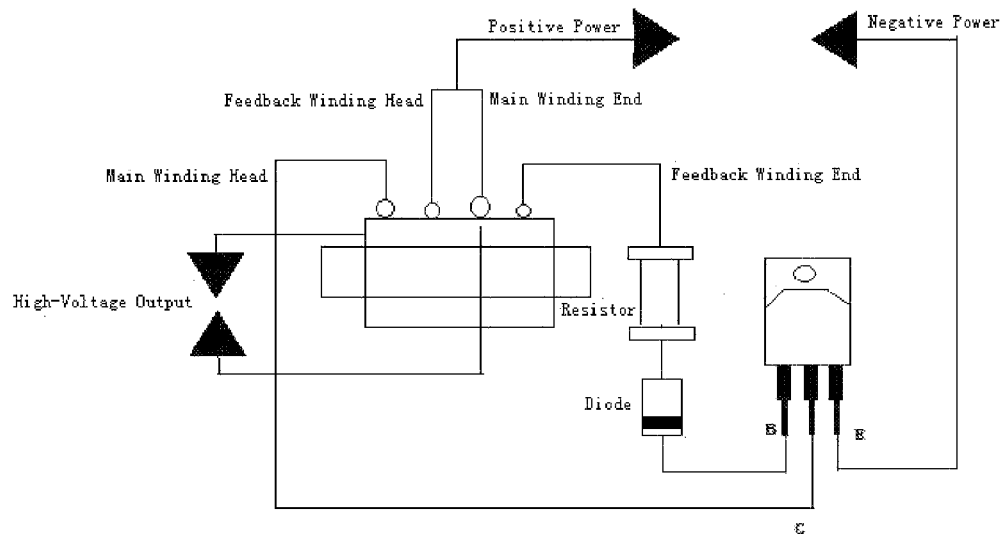
FIG. 7 is a structural diagram of a circuit principle of embodiment 1 of the present invention.
Figure 8:
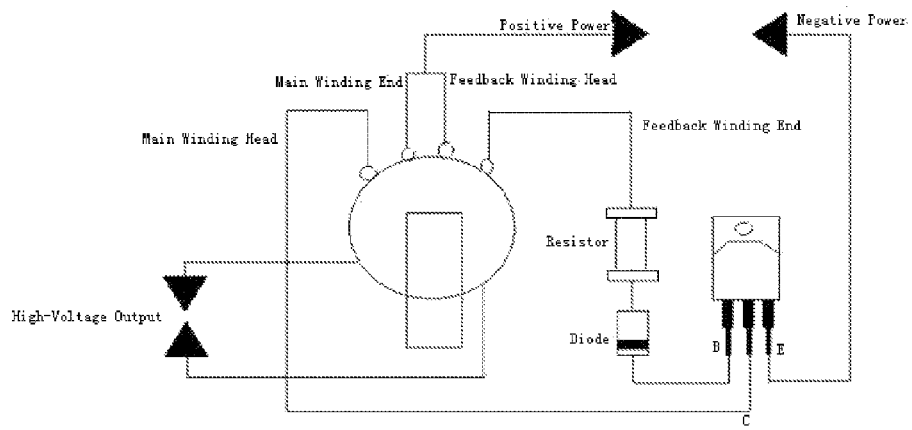
FIG. 8 is a structural diagram of a circuit principle of embodiment 2 of the present invention.

The technical solutions in the embodinlents of the present invention will be clearly and fully described below in combination with the drawings in the embodiments of the present invention. Apparently, the described embodiments are merely part of the embodiments of the present invention, not all of the embodiments. Based on the embodiments In the present invention, all other embodiments obtained by those skilled in the art without contributing creative labor will belong to the protection scope of the present invention.

The embodinlent of the present invention discloses a plasma-containing modular arc generator which not only has low cost and green environmental protection performance, but also conserves energy.

A plasma-containing modular arc generator comprises: a shell 9, and also comprises: an energy storage device 1 arranged in the shell 9; a charging circuit module 2 and a boosting circuit module 3 arranged on both sides of the energy storage device 1; a charging input end 4, a switch button 10 and an output end 12 arranged on the shell 9; a high-voltage converting module 5 connected to one side of the boosting circuit module 3 through a discharging mode; a USB output port 13 arranged on the output end 12; and a high-voltage ionizing ignition module 7 connected to one end of the high-voltage converting module 5, wherein the energy storage device 1 comprises an energy storage module of a polymer battery 6, as well as an input end 8 and an input converting circuit of a solar panel 14 successively connected \vith the energy storage module of the polymer battery 6; the boosting circuit module 3 mainly comprises a control chip 15, an MOS transistor 16 and a flying back transformer 17, controls altenlating current on the MOS transistor 16 through a square \Vave signal generated by the control chip 15, and conducts boost through the flying back transformer 17 connected in series; and a USB charging interface 18 and a device terminal charging interface 19 are arranged on the charging input end 4.

To further optimize the above technical solution, the energy storage module of the polymer battery 6 can be replaced by an energy storage lnodule of a capacitor, and the energy storage nlodule of the polymer battery 6 is provided with a power supply chip.

To further optimize the above technical solution, the shell 9 is made of metal.

To further optimize the above technical solution, a radiation fin is installed on the MOS transistor 16.

To further optimize the above technical solution, a DIP socket is arranged on one end of the control chip 15, and meanwhile, a capacitor, a diode, a potentiometer and a resistor are connected through the DIP socket.

To further optimize the above technical solution, the high-voltage converting module 5 comprises a triode and a transformer and adjusts the output current and the output voltage of the transformer through the resistor; and meanwhile, the triode is connected with one end of the flying back transformer 17 in series.

To further optimize the above technical solution, the triode drives the transformer through a self-excitation mode.

Embodiment 1

A plasma-containing modular arc generator comprises: a shell; an energy storage device arranged in the shell; a charging circuit module and a boosting circuit module arranged on both sides of the energy storage device; a charging input end, a switch button and an output end arranged on the shell; a high-voltage converting module connected to one side of the boosting circuit module through a discharging mode; a USB output port arranged on the output end; and a high-voltage ionizing ignition lnodule arranged on one end of the high-voltage converting module, wherein the boosting circuit module mainly comprise TL494, IRF540 MOS transistor and a flying back transformer T of an eight-pin black and white TV, and controls Q1 on the IRF540 MOS transistor through a square wave signal generated by a fixed-frequency pulse-width modulation circuit TL494; alternating current on Q1 is boosted to 2 k-10 kV when passing through the flying back transformer T of the eight-pin black and white TV connected in series; after boosting, a high-voltage rectification diode connected in series is used for half-wave rectification; and high-frequency high voltage with DC component or DC high voltage with high-frequency ripple wave is outputted.

TL494 in the embodiment is equivalent to a square-wave generator with variable frequency and duty cycle and can be replaced by a multivibrator comprising a 555 integrated circuit, an operational amplifier or a transistor.

Important parameters of the circuit in the embodiment comprise as follows:

The frequency of output square wave is determined by five-pin ground capacitance and six-pin ground capacitance of TL494, i.e., fosc=1.1/(R1+RP2)–C2. The duty cycle of square wave is determined by partial voltage on RP 1 and adjusted between 0% and 100%. Accordingly, current and output voltage of the transformer can be regulated.

A 16-pin DIP socket is arranged on one end of TL494, and the DIP socket is connected in series or in parallel with a capacitor \vith 4000 JIF and 16V, a 100 nF ceramic capacitor, a 10 nF ceramic capacitor, a 50 k potentiometer, a 10 k potentiometer, a 1.5 k potentiometer and a 10 ohm resistor.

A large enough radiation fin is arranged on the IRF540 MOS transistor, and the space of the radiation fin is reserved.

Pins of the flying back transformer T of the eight-pin black and white TV: Pin 4 is a ground wire of a secondary coil; pins 2, 5, 6, 7 and 8 are primary coils; pin 5 and pin 8 are recommended to introduce an AC signal; high voltage can be induced at secondary level by any two of these pins; and a selection can be lnade according to the performance in an actual circuit. Of course, it is allowed to self-wind the primary coil using conducting 'vires directly on a magnetic bar.

When a high-voltage generator is debugged, a low-voltage part is firstly debugged; a power supply chip is not inserted; and after a power supply is connected, power voltage on the power supply chip and the potential of each point of the circuit are tested with a multimeter. After confirming that both are normal, the power supply is disconnected and the power supply chip is connected. Then, grid voltage of the MOS transistor is measured by an oscilloscope. If nothing goes wrong, the waveform of the square wave can be seen on a screen. Next, the frequency and the duty cycle of the square wave are regulated. The duty cycle is regulated by the potentiometer RP 1. The frequency is regulated by RP2. The oscillation frequency is regulated to about 120 KHz. The duty cycle is regulated to about 10%. The power supply is disconnected, and the flying back transformer is connected. At this time, pay attention to the temperature of the radiation fin so as to avoid burning MOS due to overheat. The output of the power supply is opened. Pay attention to the current value. If the current value is too large, the power supply is tunled off immediately. Then, the RP1 is regulated for reducing the duty cycle of the square wave. Next, try again. If higher output voltage is needed, the current of the MOS transistor can be increased within an allowable range of the radiation fin. An output line of the flying back transformer is taken up, and a line head is made to be close to the outgoing line of pin 4 of the flying back transformer, thereby seeing a beautiful arc.

When the high-voltage electrode approaches and the electric field between the electrodes approaches the breakdown strength of the air, the air is broken down, thereby generating a bright arc. The plasma generated by arc discharge in the air is a thermal plasma. Electron temperature is almost the same as gas telnperature, and can reach 103-105 k. The plasnla can be applied to ablative material, smelting metal, surface processing, etc. by means of localized high temperature and high chemistry. If the arc is led to white paper, it can be seen that the surface of the paper is carbonized and a slnall hole is burned instantaneously by the arc.

On the basis of the circuit of embodiment 1, circuit topology can be changed for greatly increasing working efficiency. A feedback circuit and an output filtering capacitor can be added to obtain an adjustable high-voltage power supply with stabilized voltage. The primary coil can also be recoiled on the magnetic bar. In this way, 15 kV level voltage is obtained on the flying back transformer. Hence, a more splendid plasnla arc can be obtained, and a standby power supply can be provided for a static lifter.

Meanwhile, regulating the duty cycle can control the current magnitude of arc discharge. Quick change of the duty cycle is enough to initiate quick thermal expansion and cold contraction of the air around the arc, thereby making a sound. This is also a principle of a plasma loudspeaker. Because only very little mass of air is vibrated, an excellent high-frequency response is obtained. Theoretically, in the case where a stable arc is pulled, lnodulated arc sound can be obtained by a four-pin loading audio signal of TL494.

Further, the arc is presented on a honey peach. The honey peach is connected with the ground wire of the secondary coil. Then, a sharp end of the high-voltage output line discharges for the peach. The generated arc bums and carbonizes peel to form black scorch thereon. Due to high temperature of the arc, only a surface layer is carbonized, and the inside juicy pulp remains. This cannot be done by an ordinary flame. As long as the material has certain conductivity, such as melon, fruit, meat, vegetables and wetted leather, such method can be used for lettering thereon.

Further, on the premise that the high-voltage generator is already present, an arc ball can be self-made only by an electrode-containing glass ball filled with rarefied gas.

Embodiment 2

Modularization, downsizing and miniaturization principles of an integrated circuit:

Electronic principle: A discharge inversion principle is adopted, I.e., Tesla coil, Marxism principle (electric pulse).

The Tesla coil also has another name in Chinese, which is literally translated from the English name of Tesla. This is a high-frequency series resonant transformer of distributed parameters, and can obtain megavolt of high-frequency voltage.

Working principle: The power supply firstly charges a main capacitor. When the voltage reaches a discharge threshold of the generator, the air in the gap of the cigarette lighter is ionized and ignited and approxilnately conducted. A primary resonant loop is established, and energy is transferred to a secondary loop through oscillation. The secondary loop is oscillated therewith and receives the energy. The voltage of a discharge top cap is gradually increased, and the air nearby is ionized. A discharge path is sought. Once a channel is formed with the ground, lightning occurs instantaneously. If there is no lightning, after several (frequency is mainly related to a coupling coefficient) cycles, the primary loop finishes releasing the energy. Most of energy is transferred to the secondary loop, and a part of energy is lost on the loop. The secondary loop continues to oscillate, and turns from guest to host to bring the primary loop to oscillate. The energy obtained just no\v is returned to the primary loop in the same mode, but a part of energy is also lost on the loop, and so on, until most of energy is lost. Voltage and current on both ends of the generator are inadequate. At this nloment, the generator is equivalently broken. An external power supply continues to charge the main capacitor. The charging process is much longer than the discharging process, and takes about 3-10 milliseconds. Therefore, the discharge frequency of the Tesla coil is more than 100 times per second. It seems a continuous discharge effect by naked eyes.

Each embodiment in the description is described in a progressive way. The difference of each embodiment from each other is the focus of explanation. The same and similar parts among all of the embodiments can be referred to each other. For the device disclosed by the embodiment, because the device corresponds to the method disclosed by the embodiment, the device is sinlply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. A plasma-containing modular arc generator, comprising: a shell and characterized by also comprising: an energy storage device arranged in said shell; a charging circuit module and a boosting circuit module arranged on both sides of said energy storage device; a charging input end, a switch button and an output end arranged on said shell; a high-voltage converting module connected to one side of said boosting circuit module through a discharging mode; a USB output port arranged on said output end; and a high-voltage ionizing ignition module connected to one end of said high-voltage converting module, wherein said energy storage device comprises an energy storage module of a polymer battery, as well as an input end and an input converting circuit of a solar panel successively connected with said energy storage module of the polymer battery; the boosting circuit module mainly comprises a control chip, an MOS transistor and a flying back transformer, controls alternating current on said MOS transistor through a square wave signal generated by said control chip, and conducts boost through the flying back transformer connected in series; and a USB charging interface and a device terminal charging interface are arranged on said charging input end, the plasma-containing modular arc generator is characterized in that said high-voltage converting module comprises a triode and a transformer and adjusts the output current and the output voltage of the transformer through the resistor; and meanwhile, the triode is connected with one end of said flying back transformer in series.

2. The plasma-containing modular arc generator according to claim 1, which is characterized in that said energy storage module of the polymer battery can be replaced by an energy storage module of a capacitor, and said energy storage module of the polymer battery is provided with a power supply chip.

3. The plasma-containing modular arc generator according to claim 1, which is characterized in that said shell is made of metal.

4. The plasma-containing modular arc generator according to claim 1, which is characterized in that a radiation fin is installed on said MOS transistor.

5. The plasma-containing modular arc generator according to claim 1, which is characterized in that a DIP socket is arranged on one end of said control chip, and meanwhile, a capacitor, a diode, a potentiometer and a resistor are connected through the DIP socket.

6. The plasma-containing modular arc generator according to claim 1, which is characterized in that said triode drives said transformer through a self-excitation mode.

* * * * *